(12) United States Patent
Osumi et al.

(10) Patent No.: US 10,634,861 B2
(45) Date of Patent: Apr. 28, 2020

(54) DISPLAY DEVICE

(71) Applicant: OMRON Corporation, Kyoto (JP)

(72) Inventors: Yoshimasa Osumi, Kyoto (JP); Yuji Hirose, Kyoto (JP); Keiichiro Tanaka, Shiga (JP); Toshinori Yamasue, Shiga (JP)

(73) Assignee: Omron Corporation, Kyoto (JP)

( * ) Notice: Subject to any disclaimer, the term of this patent is extended or adjusted under 35 U.S.C. 154(b) by 146 days.

(21) Appl. No.: 15/839,358

(22) Filed: Dec. 12, 2017

(65) Prior Publication Data

US 2018/0100979 A1    Apr. 12, 2018

Related U.S. Application Data

(63) Continuation of application No. PCT/JP2016/073687, filed on Aug. 11, 2016.

(30) Foreign Application Priority Data

Sep. 1, 2015   (JP) ................. 2015-172233

(51) Int. Cl.
  *G02B 6/10*       (2006.01)
  *G02B 6/42*       (2006.01)
  (Continued)

(52) U.S. Cl.
  CPC ............ *G02B 6/4246* (2013.01); *B60K 35/00* (2013.01); *B60K 37/02* (2013.01); *G01D 11/28* (2013.01);
  (Continued)

(58) Field of Classification Search
  CPC ..... G02B 6/0011; G02B 27/2228; G02B 5/09
  (Continued)

(56) References Cited

U.S. PATENT DOCUMENTS 6,144,480 A    11/2000  Li et al.
6,174,064 B1 *  1/2001  Kalantar ............. G02B 6/0036
                                                362/23.15
(Continued)

FOREIGN PATENT DOCUMENTS

CN    101460914 A    6/2009
CN    103339476 A    10/2013
(Continued)

OTHER PUBLICATIONS

International Search Report issued in PCT/JP2016/073687 dated Oct. 18, 2016 (2 pages).
Written Opinion of the International Searching Authority issued in PCT/JP2016/073687 dated Oct. 18, 2016 (4 pages).
(Continued)

*Primary Examiner* — Audrey Y Chang
(74) *Attorney, Agent, or Firm* — Osha Liang LLP

(57) ABSTRACT

A display device configured to show an image inside an instrument panel for a vehicle includes: a light source configured to emit light; and a light guide element configured to guide incident light from the light source. The light guide element includes: an emission surface configured to output incident light; and a plurality of light focusing portions configured to change the path of the incident light toward the emission surface, causing the light output to converge toward a convergence point or convergence line outside the light guide element or to radiate from a convergence point or convergence line outside the light guide element and thereby form an image outside the light guide element. The light guide element is configured to form light to thereby present an image.

20 Claims, 9 Drawing Sheets

(51) Int. Cl.

| | |
|---|---|
| *B60K 35/00* | (2006.01) |
| *F21V 8/00* | (2006.01) |
| *G01D 11/28* | (2006.01) |
| *B60K 37/02* | (2006.01) |
| *G02B 30/27* | (2020.01) |
| *G02B 30/34* | (2020.01) |
| *G02B 30/56* | (2020.01) |
| *G02B 6/124* | (2006.01) |
| *G02B 6/28* | (2006.01) |
| *H04N 13/307* | (2018.01) |

(52) U.S. Cl.
CPC ............. *G02B 6/006* (2013.01); *G02B 6/124* (2013.01); *G02B 6/2848* (2013.01); *G02B 30/27* (2020.01); *G02B 30/34* (2020.01); *G02B 30/56* (2020.01); *H04N 13/307* (2018.05); *B60K 2370/20* (2019.05); *B60K 2370/33* (2019.05); *G02B 6/002* (2013.01)

(58) Field of Classification Search
USPC .................. 362/23.15, 23.16, 459; 385/146
See application file for complete search history.

(56) References Cited

U.S. PATENT DOCUMENTS

| | | | |
|---|---|---|---|
| 8,998,432 B2* | 4/2015 | Fukutani | ................ G01D 11/28 362/23.16 |
| 2007/0279391 A1 | 12/2007 | Martlila et al. | |
| 2013/0314945 A1 | 11/2013 | Fukutani | |
| 2014/0268327 A1* | 9/2014 | Dunn | ...................... G02B 5/09 359/466 |

FOREIGN PATENT DOCUMENTS

| | | |
|---|---|---|
| EP | 0883837 B1 | 7/2006 |
| JP | 2000-510603 A | 8/2000 |
| JP | 2008275922 A | 11/2008 |
| JP | 2009540440 A | 11/2009 |
| JP | 2011-222233 A | 11/2011 |
| JP | 2014-228314 A | 12/2014 |
| WO | 2014152119 A1 | 9/2014 |

OTHER PUBLICATIONS

Office Action issued in Chinese Application No. 201680034232.6; dated Aug. 2, 2019 (19 pages).

* cited by examiner

DISPLAY DEVICE

BACKGROUND

Field

The present invention relates to a display device for displaying an image inside a vehicle such as an automobile.

Related Art

Display devices may be used practically for various kinds of optical ornaments in an instrument panel in a vehicle such as a passenger car. For instance, Japanese Patent Publication No. 2014-228314 A discloses a vehicle display device built from a display element and a reflective component; the vehicle display device is capable of 3D-like presentation, thus improving the marketability of the display device.

However, the market demands display devices capable of more elaborate presentations.

One or more embodiments of the present invention provides a display device capable of ornate presentations by providing the display device with a light guide element that changes the optical path of light and forms light to thereby present an image on the instrument panel.

SUMMARY

A display device according to one or more embodiments of the present invention is configured to show an image inside an instrument panel for a vehicle, and includes: a light source configured to emit light; and a light guide element configured to guide incident light from the light source; the light guide element including: an emission surface configured to output incident light; and a plurality of light focusing portions configured to change the path of the incident light toward the emission surface, causing the light output to converge toward a convergence point or convergence line outside the light guide element or to radiate from a convergence point or convergence line outside the light guide element and thereby form an image outside the light guide element; and the light guide element configured to form light to thereby present an image.

The display device described herein further includes: a protective cover configured to cover all or part of an instrument panel; and the light guide element adhered to said protective cover.

In the display device described herein the portion of the light guide element adhered to the protective cover is a hard thin film or a flexible thin film.

In the display device described herein the light guide element is configured to cover all or part of an instrument panel.

In the display device described herein the image presented is configured as a static image inside an instrument panel.

In the display device described herein the image presented is configured to relate to a gauge inside an instrument panel.

In the display device described herein the image presented configured to include at least one of numbers, tick marks, or a borderline for a gauge.

In the display device described herein the image presented is configured to represent at least one of a vehicle state, a ridership state, or a vehicle operation.

In the display device described herein the image presented is configured as a decorative image inside an instrument panel.

A display device described herein is mounted in a conveyance and configured to show an image inside the conveyance; a light source configured to emit light; and a light guide element configured to guide incident light from the light source; the light guide element including: an emission surface configured to output incident light; and a plurality of light focusing portions configured to change the path of the incident light toward the emission surface, causing the light output to converge toward a convergence point or convergence line outside the light guide element or to radiate from a convergence point or convergence line outside the light guide element and thereby form an image outside the light guide element; and the image presented configured as at least one of numbers, tick marks, or a borderline for a gauge.

A display device according to one or more embodiments of the present invention is capable of presenting an image formed from light inside the cabin of a passenger vehicle.

Effects

One or more embodiments of the present invention is provided with a light source and a light guide element, and the light guide element uses incident light entering therein from the light source to form an image externally. Thus, one or more embodiments of the present invention exhibit superior benefits, such as making it possible increase flexibility of an interior design.

DETAILED DESCRIPTION

Embodiments of the present invention are described in detail with reference to the drawings. Note that the following working examples are merely embodiments of the present invention and in no way limit the technical character of the present invention.

Figure 1:
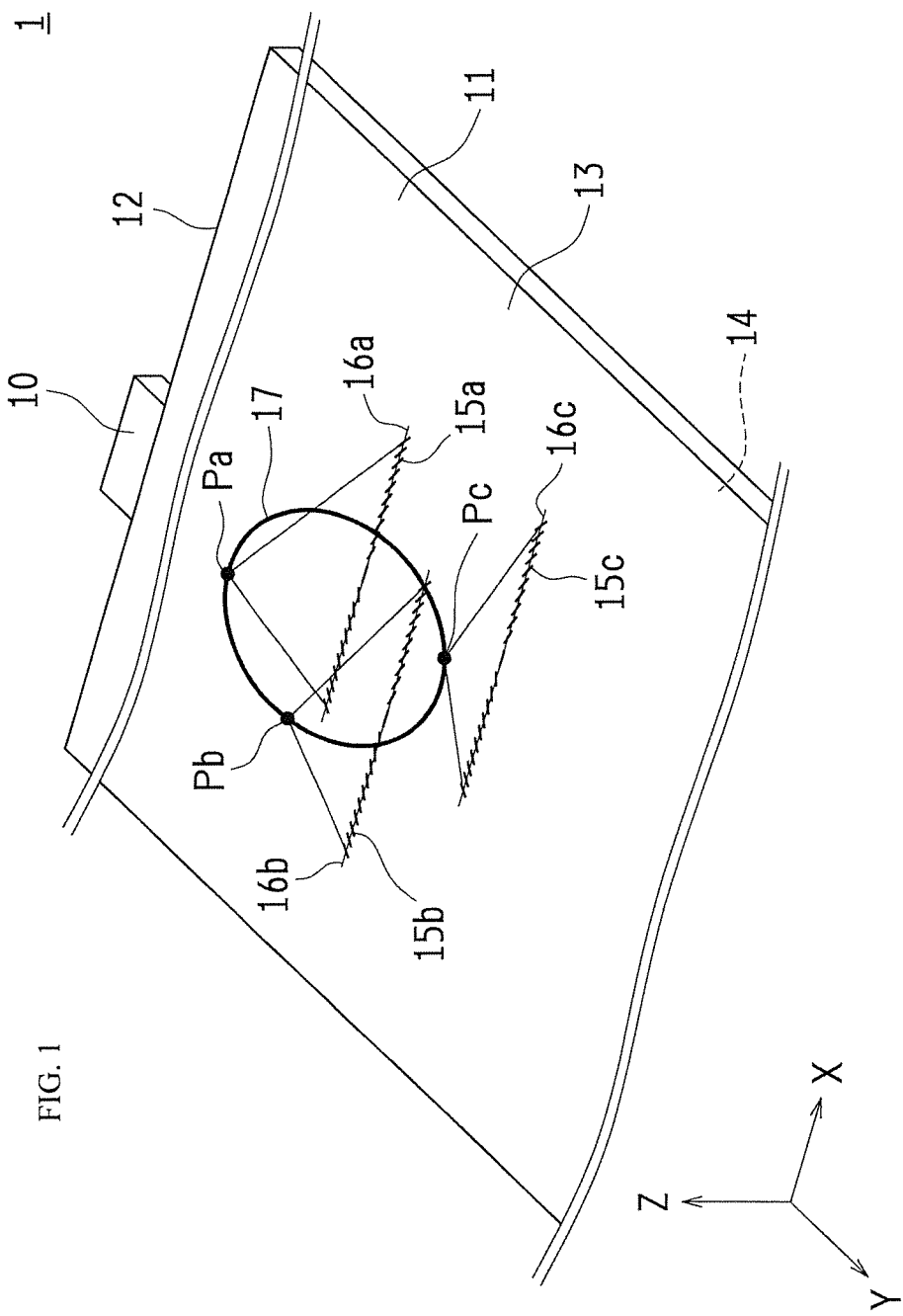
FIG. 1 is for describing a display device according to one or more embodiments of the present invention and schematically illustrates the display device along with an image formed in a space.

The display device according to one or more embodiments of the present invention focuses light in a space inside a transport, e.g., vehicle such as a passenger car, and produces an image. First, the principle of producing an image in a space described. FIG. 1 is for describing a display device according to one or more embodiments of the present invention and schematically illustrates the display device along with an image formed in a space. Note that the drawings are provided as outlines or schematic views to facilitate a simple and easy-to-understand description. There are also cases where the drawings referenced in the description contained elements that are not drawn to scale in terms of the horizontal and vertical proportions or the spaces between components.

The display device 1 is provided with a light source 10 that emits light and a light guide plate 11 (light guide element) that guides incident light entering from the light source 10. The light source 10 may be configured using a light emitting element such as an LED with the light emitted from the light source 10 entering the light guide plate 11. The light guide plate 11 may be formed from a flexible thin-film material or curable sheet into a rectangular panel-like shape using a transparent resin having a high refractive index such as a polycarbonate (PC) resin or poly methyl methacrylate (PMMA) resin, or using an inorganic material such as glass. Here "panel like" indicates an object that is shorter (thinner) in the thickness direction (Z axis direction) than in the planar direction spreading out in two dimensions (XY plane) orthogonal to the thickness direction. That is, while the light guide plate 11 is a rectangular parallelepiped, the length thereof in the thickness direction (Z axis direction) is less than the length in a plane spreading out in two dimensions and formed by the longitudinal direction (X axis direction) and the transverse direction (Y axis direction).

The light source 10 is installed at one end surface in the longitudinal direction of the light guide plate 11. That is, one of the surfaces making up the short side of the rectangle in the thickness direction is the incidence end surface 12 where light emitted from the light source 10 enters. The light guide plate 11 causes light entering therein from the incidence end surface to spread out in planar form. The panel-like light guide plate 11 includes an emission surface configured to emit incident light entering from the light source 10 and a rear surface 14 relative to and across from the emission surface 13.

In the description that follows, the rectangular coordinate system, and in particular the right-handed system of x axis, y axis, and z axis is used as necessary. The X axis is the transverse direction of the light guide plate 11, i.e., the direction along the short side of the rectangle. The Y axis is the longitudinal direction of the light guide plate 11, i.e., the direction along the long side of the rectangle, where the direction from the incidence end surface 12 toward the end surface facing the incidence end is the positive direction. The Z axis is the thickness direction of the light guide plate 11, where the direction from the rear surface 14 to the emission surface 13 is the positive direction. The light guide plate 11 may be used in a non-planar way, e.g., may be bent for use. In this case, the surface including the main portion of the emission surface 13 or a neighboring surface may be used as a reference for the X axis, Y axis, and Z axis.

A plurality of light focusing portions 15 is formed on the rear surface 14 of the light guide plate 11; the light focusing portions 15 are represented as light focusing portions 15*a*, 15*b*, 15*c*, . . . in the drawings. The light focusing portions 15 are situated along the progressive path of incident light entering from the incidence end surface; that is, the light focusing portions 15 adjust the optical path of the incident light toward the emission surface 13. Here, the light focusing portions 15 are illustrated as optical surfaces formed inside the light guide plate 11, and in this particular case, as reflection surfaces 150 (FIG. 2: 150*x*, 150*y*; and FIG. 3: 150*x*1, 150*x*2, 150*x*3) that reflect incident light entering from the incidence end surface 12. Oblique notches may be cut into the rear surface 14 with the inclined surfaces serving as the reflection surfaces 150. The reflection surfaces 150 of the light focusing portions 15 are formed as substantially continuous in the X axis direction. More specifically, the plurality of light focusing portions 15*a* fall along a line 16*a*, the plurality of light focusing portions 15*b* fall along a line 16*b*, and the plurality of light focusing portions 15*c* fall along a line 16*c*. The other light focusing portions 15 (not shown) are formed in the same manner. Here the lines 16 (lines 16*a*, 16*b*, 16*c*, . . . ) are virtual straight lines extending substantially parallel to the X axis on the rear surface 14. Any given light focusing portion 15, 15, . . . is formed as substantially continuous along a straight line 16 that is substantially parallel to the X axis direction. The incident light is guided toward the light focusing portions 15, 15, . . . lined up along the X axis direction.

The light focusing portions 15 include components such as the reflection surfaces 150 for changing the optical path. The reflection surface 150 in a light focusing portion 15 changes the path of incident light causing the light to exit from the emission surface 13 and substantially converge at convergence point P corresponding to the light focusing portion 15. FIG. 1 depicts a portion of the light focusing portions 15, namely, light focusing portions 15*a*, 15*b*, 15*c*, . . . ; more specifically, FIG. 1 depicts the plurality of light rays with paths changed by each of the light focusing portions 15*a*, 15*b*, 15*c*, . . . converging at convergence points Pa, Pb, Pc respectively. Each of the light focusing portions 15 cause the light rays to converge at convergence points P to form an image, thus forming an image 17.

More specifically, the plurality of light focusing portions 15 on any one of the lines 16*a*, 16*b*, 16*c*, . . . may correspond to a convergence point P in the image 17. The plurality of light focusing portions 15 in any given line 16 may change the optical path of the light rays emanating from the positions of the light focusing portions 15 when light reflects from the optical surfaces of, e.g., the reflection surfaces 150; hereby the light rays exit from the emission surface 13 and converge at a convergence point P. Therefore, the wavefront of light from the plurality of light focusing portions 15 becomes a wavefront that appears to radiate from the convergence point P. For example, the plurality of light focusing portions 15*a* on the line 16*a* corresponds to a convergence point Pa in the image 17. The light focusing portions 15*a* change the optical path of the light rays guided toward the plurality of light focusing portions 15*a* on the line 16*a*, and thus the light rays exit from the emission surface 13 and converge at the convergence point Pa. Light reflected by the plurality of light focusing portions 15 along other lines 16 converges identically at convergence points P. Thus, any desired light focusing portion 15 can provide a wavefront of light so that light appears to radiate from the corresponding convergence point P. The convergence points P correspond to mutually different light focusing portions 15. A grouping of a plurality of convergence points P that correspond to each of the light focusing portions 15 produces a recognizable image 17 in a space. The display device 1 thus projects the image 17 as a three-dimensional image in a space. The image 17 depicted in FIG. 1 is drawn as a three-dimensional image with lines; the lines used to draw the image 17 are produced by grouping a plurality of convergence points P corresponding to each of the light focusing portions 15.

The display device 1 forms an image with light exiting from the emission surface 13 to produce the image 17 as a spectroscopic image. The image 17 is a spectroscopic image that may be recognized in a space by an observer. Note that in this specification, the term spectroscopic image refers to an image 17 that appears to be at a location that is different from the emission surface 13 external to the display device 1. The term spectroscopic image is not limited to a three-dimensional image and includes a two-dimensional image perceived at a location separate from the efficient surface 13 of the display device 1, for instance. In other words the term "spectroscopic image" does not refer only to an image perceived as having a solid shape, but also includes the image 17 in two-dimensional form perceived at a different location than on emission surface 13 of the display device 1 and represents an image 17 that appears to be protruding from the light guide plate 11 of the display device 1.

The light guided by the light guide plate 11 is oriented in a direction connecting locations in the light guide plate 11 and the light source 10 while not including a spread component orthogonal to a direction connecting locations in the light guide plate 11 and the light source 10. The light focusing portions 15 may be provided at locations separated from the light source 10; in this case, the light guided by the light guide plate 11 is oriented generally towards the Y axis direction from the location at which the light focusing portion is provided but does not spread in the X axis direction. Therefore, the light from the light focusing portion 15 substantially converges onto a single convergence point P in a plane parallel to the XZ plane that includes the convergence point P.

When light entering the light focusing portions 15 spread in the Z axis direction, the light from the light focusing portions 15 converge on a convergence line along the Y axis in a space containing the convergence point P. However, the description of the embodiment focuses on the convergence of light in the XZ plane to facilitate understanding of the embodiment and describes the same as light from the light focusing portions 15 converging on the convergence points P.

Figure 2:
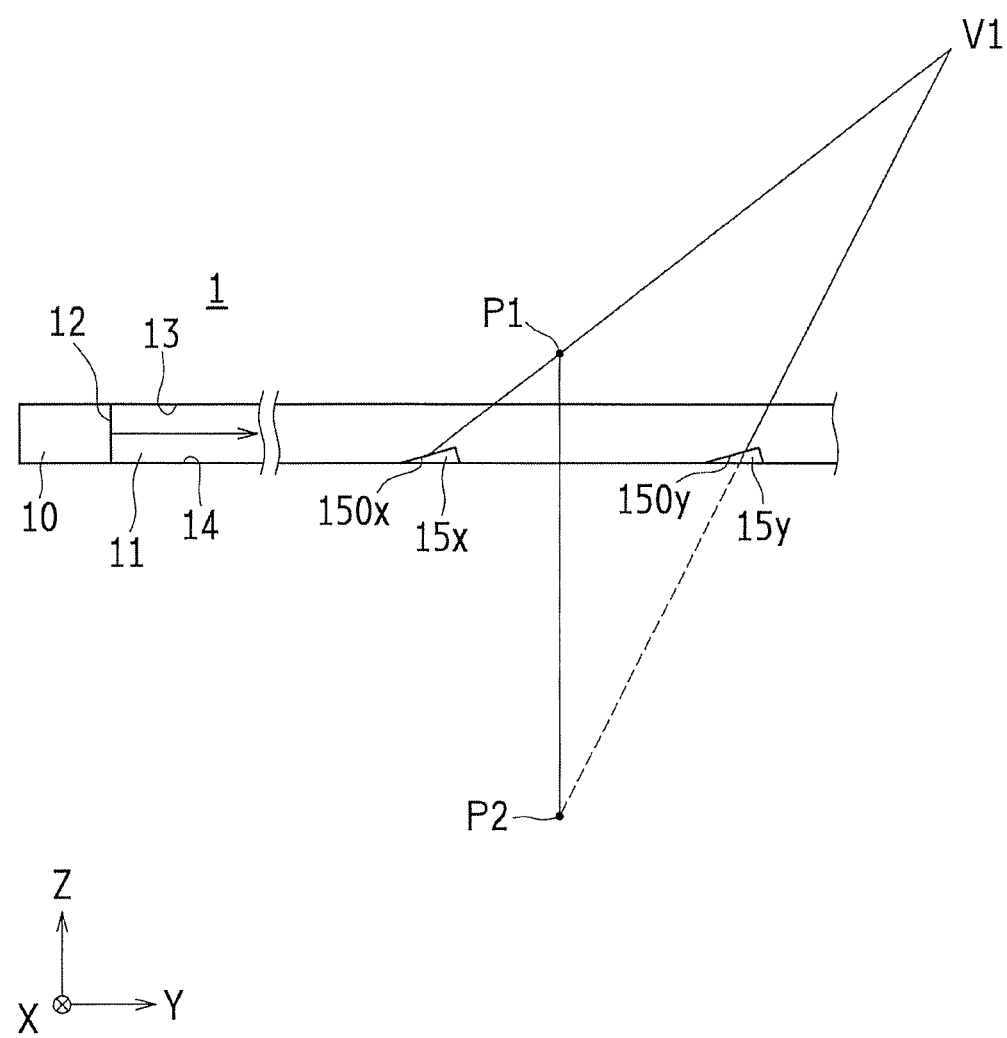
FIG. 2 is a schematic view outlining a cross section of the display device according to one or more embodiments of the present invention and an optical path.
Figure 3:
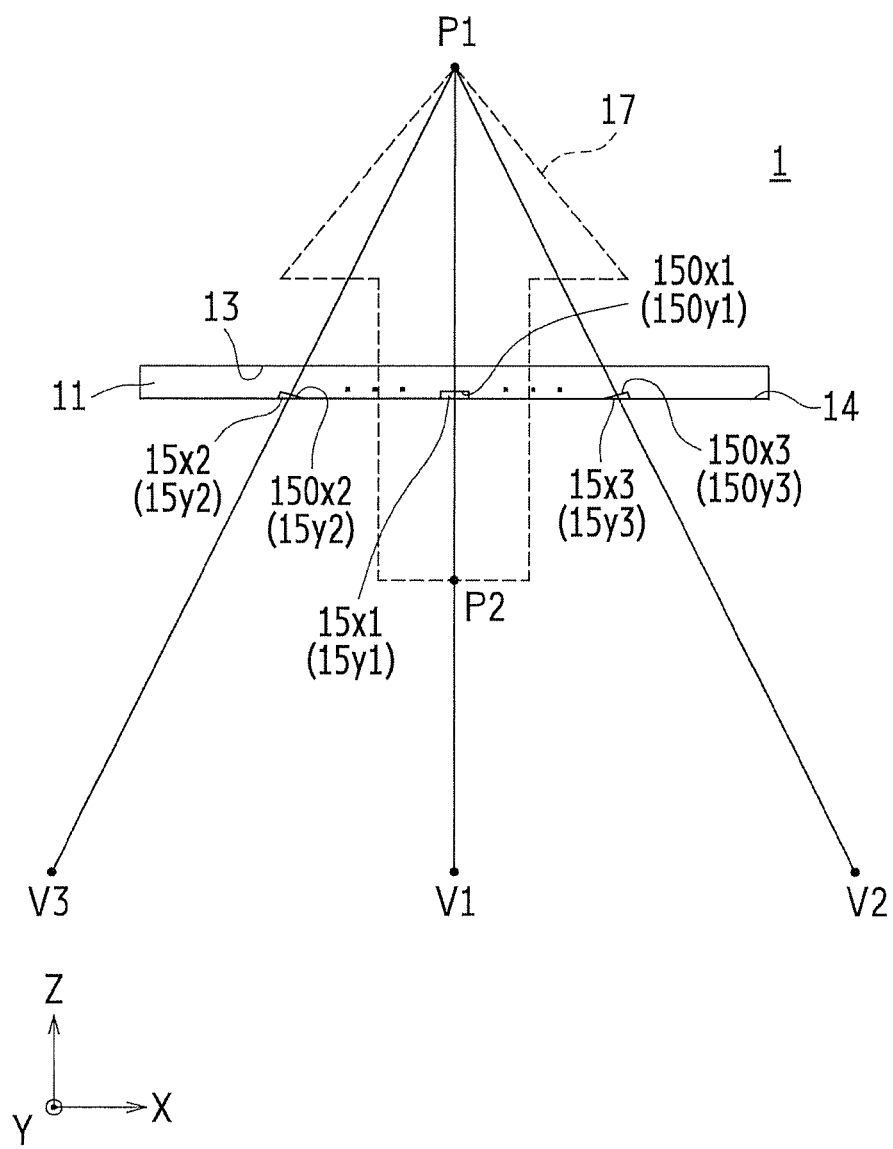
FIG. 3 is a schematic view outlining a cross section of the display device according to one or more embodiments of the present invention and an optical path.

FIG. 2 and FIG. 3 are schematic views outlining a cross section of the display device 1 according to one or more embodiments of the present invention and an optical path. FIG. 2 illustrates a cross-section parallel to the YZ plane, and FIG. 3 also illustrates the image 17 viewed by an observer of a cross-section parallel to the XZ plane. FIG. 2 and FIG. 3 illustrates not only the emission surface 13 of the light guide plate 11 (i.e., the positive Z axis direction), but also provides an example of the image 17 representing an arrow that also spreads at the rear surface 14 (negative Z axis direction) In the example illustrated in FIG. 2 and FIG. 3, the image 17 which represents an arrow appears with the front portion of the arrow protruding from the emission surface 13 and the rear portion of the arrow protruding from the rear surface 14.

As illustrated in FIG. 2, the light source 10 is installed at the incident end surface 12 of the light guide plate 11, and the incidence end surface 12 and the emission surface 13 are substantially orthogonal. Additionally, the rear surface 14 faces the emission surface 13, and the rear surface 14 is also substantially orthogonal to the incidence end surface 12. The rear surface 14 is a flat surface substantially parallel to the emission surface 13 and is provided with inclined surfaces that form the reflection surfaces 150 (150$x$, 150$y$) of the light focusing portions 15. The flat rear surface 14 along with the emission surface 13 guides the incident light entering the light guide plate 11 from the incidence end surface 12 via total internal reflection therebetween and function to spread the light in the light guide plate in planar form. The inclined reflection surfaces 150 of the light focusing portions 15 reflect the incident light entering the light guide plate 11 to thereby adjust the optical path of the light toward the emission surface 13.

That is, the light emitted from the light source 10 and entering the light guide plate 11 from the incidence end surface 12 is repeatedly totally reflected between the emission surface 13 and the rear surface 14 within the light guide plate 11 and propagates therethrough in planar form. On arriving at a reflection surface 150 formed in the light focusing portion 15, the light propagating through the light guide plate 11 is reflected by the reflection surface 150 and exits to the outside from the emission surface 13.

As illustrated in FIG. 2 and FIG. 3, the plurality of light focusing portions 15$x$ (light focusing portions 15$x$1, 15$x$2, 15$x$3, . . . ) located on a line 16 include reflection surfaces 150$x$1, 150$x$2, 150$x$3, . . . , respectively. The reflection surfaces 150$x$1, 150$x$2, 150$x$3, . . . corresponding to the plurality of light focusing portions 15$x$ located along the line 16 reflect light toward the emission surface 13 toward a direction converging at a convergence point P1 near the emission surface 13. A plurality of light focusing portions 15$y$ (light focusing portions 15$y$1, 15$y$2, 15$y$3, . . . ) is located on another line 16 and also include reflection surfaces 150$y$1, 150$y$2, 150$y$3, . . . , respectively. The reflection surfaces 150$y$1, 150$y$2, 150$y$3 corresponding to the plurality of light focusing portions 15$y$ located along the other line 16 reflect light toward the emission surface 13 toward a direction where the light radiates from a convergence point P2 near the rear surface 14. Therefore, the incline of the reflection surface 150$y$2 of the light focusing portion 15$y$2 and the reflection surface 150$y$3 of the light focusing portion 15$y$2 (written in parenthesis in FIG. 3) are the opposite direction in FIG. 3 and are inclined toward the end surface of the light guide plate 11.

The reflection surfaces 150$x$ (e.g., the reflection surfaces 150$x$1, 150$x$2, 150$x$3, . . . ) each reflects light from the light source 10 in a direction along a line connecting a point on each of the reflection surfaces 150$x$ and the convergence point P1. The light rays reflected from the reflection surfaces 150$x$ converge at the convergence point P1. Thus, the plurality of reflection surfaces 150$x$ in corresponding light focusing portions 15$x$ reflects incident light entering from the light source 10 in a direction along a line connecting a point on each of the reflection surfaces 150$x$ and the convergence point P1. Therefore, the display device 1 can supply light from the convergence point P1 oriented toward any of the positions in a range from a position V2 through a position V1 and up to position V3. A convergence point P1 of this kind produces the image 17 which appears to protrude from near the emission surface 13.

The reflection surfaces 150$y$ (e.g., the reflection surfaces 150$y$1, 150$y$2, 150$y$3) each reflects incident light entering from the light source 10 in a direction along a line connecting a point on each of the reflection surfaces 150$y$ and the convergence point P2. The light rays reflected from the reflection surfaces 150$y$ may be extended in a direction opposite the direction the light rays travel, in which case the extension line from the light rays converge at the convergence point P2. Thus, the plurality of reflection surfaces 150*y* in corresponding light focusing portions 15*y* reflects incident light entering from the light source 10 in a direction along a line connecting a point on each of the reflection surfaces 150 and the convergence point P2. Therefore, the display device 1 can supply light from the convergence point P2 oriented toward any of the positions in a range from a position V2 through a position V1 and up to position V3. A convergence point P2 of this kind produces the image 17 which appears to protrude from the opposite side of emission surface 13 (i.e., near the rear surface 14).

As above described, the light guide plate 11 includes a plurality of light focusing portions 15 having mutually different convergence points P, where a grouping of a plurality of convergence point P including a convergence point P1 and a convergence point P2 produces an image 17 that serves as a stereoscopic image. That is, the light guide plate 11 is provided with a plurality of light focusing portions 15 which change the path of incidence light toward an emission surface 13 causing the light output to converge toward an external convergence point or convergence line or to radiate from an external convergence point or convergence line and thereby form an image externally. By grouping a plurality of convergence point P and convergence lines, the display device 1 can thus form an image 17 outside the light guide plate 11 that can be perceived by an observer as a stereoscopic image.

In other words, the following kinds of statements can be made. Light emitted from a light source 10 enters a light guide plate 11, and the light guide plate 11 guides light within a plane parallel to the emission surface 13. A plurality of light focusing portions 15 is formed on the light guide plate 11; the light focusing portions 15 lengthen in a direction (i.e., the X axis direction) orthogonal to the direction in which the light guide plate guides light within a plane parallel to the emission surface 13 (Y axis direction). Each of the light focusing portions 15 includes optical surfaces where the direction of the normal line thereof projected onto a surface parallel to the emission surface varies continuously or gradually along the length direction of the light focusing portions 15 (X axis direction). The light guided by the light guide plate 11 reflects from the optical surfaces whereby the light exits as emission light from the emission surface 13 in a direction to substantially converge on a single convergence point P or convergence line in a space, or to substantially radiate from a single convergence point P or convergence line. The convergence points P or convergence lines are mutually different for the plurality of light focusing portions 15 at different positions along the Y axis, and grouping a plurality of convergence points P or convergence lines produces an image 17 in a space.

FIG. 2 and FIG. 3 and the corresponding descriptions illustrate a stereoscopic image that appears to protrude from both the emission surface 13 and the rear surface 14; this is used to describe the basic principles behind producing a stereoscopic image. However, as illustrated in FIG. 1 the stereoscopic image may appear to protrude from near only one surface.

The reflection surfaces 150 here serve as the light focusing portions 15. However, the light focusing portions 15 can have various forms so long as the light focusing portions 15 can change the path of incident light traveling through the light guide plate 11. For instance, the light focusing portion 16 may be formed as a cylindrical Fresnel lens, whereby the refraction effect of the refraction surface of the Fresnel lens (i.e. the prism surface) changes the path of the incident light. Additionally, in this case the Fresnel lens may be constituted by a plurality of parts with gaps therebetween. The light focusing portions 15 may also be formed as a diffraction grating whereby the diffraction effect may change the path of the incident light. Moreover, the reflection effect and the refraction effect of the prism may change the path of the incident light.

Additionally, the distances between all the convergence points P and emission surface 13 may be non-uniform. In this case, the density of converging light is configured to increase as the distance from the emission surface 13 increases when forming an image 17 that spreads for instance three dimensionally, or when forming a two-dimensional image 17 that contains a plane obliquely intersecting the emission surface 13. Hereby, any blurring in the image 17 formed is substantially uniform, making it possible to create an image 17 that does not make the observer uneasy.

Furthermore, while the light emitted from the light source 10 is represented as incident light entering the light guide plate 11 from the incidence end surface 12 which is one in surface in the longitudinal direction of the light guide plate 11, the incident light is not limited thereto. For example, the rear surface 14 may be taken as the light incidence surface and appropriately designed so that light enters the light guide plate therefrom.

Figure 4:
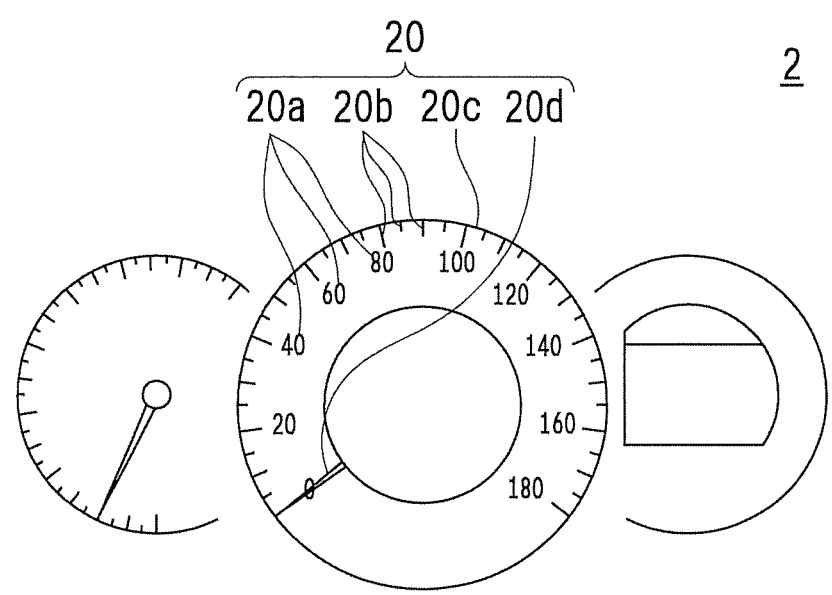
FIG. 4 is a schematic front view illustrating the components of a vehicle instrument panel provided with a display device according to one or more embodiments of the present invention.
Figure 5:
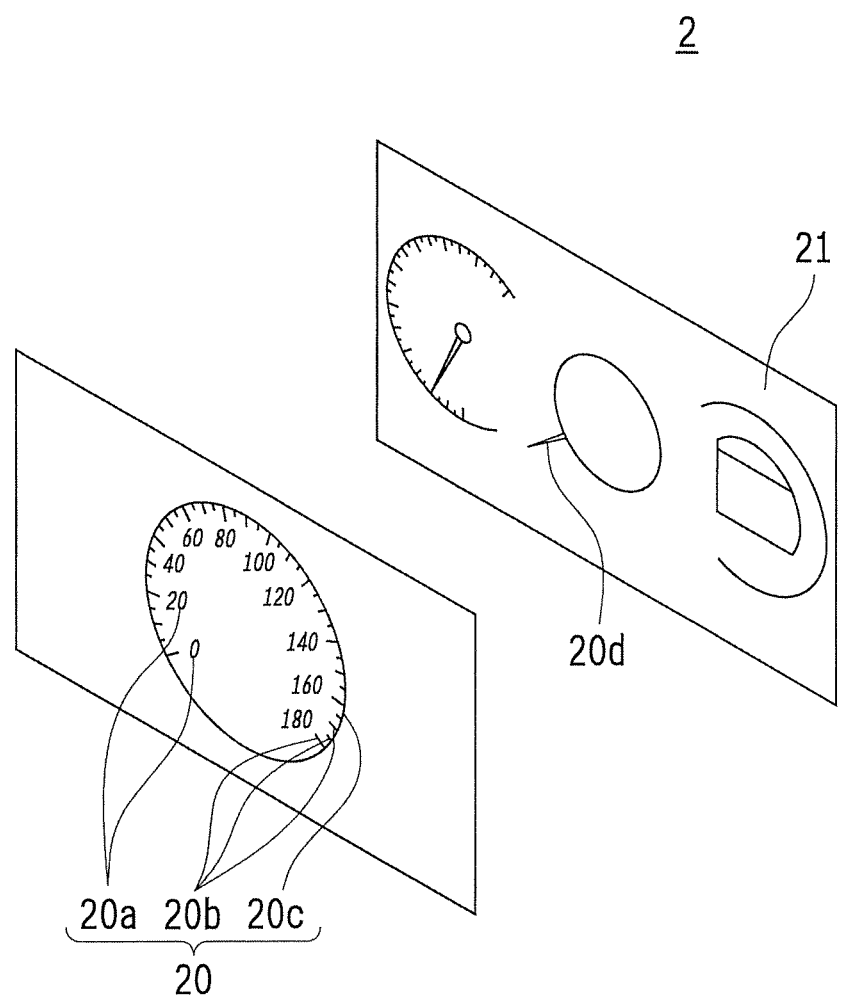
FIG. 5 is a schematic perspective view illustrating the arrangement of images recognized as gauges in the vehicle instrument panel provided with a display device according to one or more embodiments of the present invention.

A display device 1 thusly configured according to one or more embodiments of the present invention may be installed as an internal vehicle component; such an embodiment is described below. FIG. 4 is a schematic front view illustrating the components of a vehicle instrument panel provided with a display device according to one or more embodiments of the present invention. FIG. 5 is a schematic perspective view illustrating the arrangement of images recognized as gauges in the vehicle instrument panel provided with a display device according to one or more embodiments of the present invention. FIG. 4 and FIG. 5 depict the display device 1 according to one or more embodiments of the present invention installed in an instrument panel 2 (below, panel 2) as an internal vehicle component. The display device 1 presents stereoscopic images of numbers 20*a* indicating the speed, the tick marks 20*b*, and the circular borderline 20*c* of the speedometer gauge located at the center of the panel 2 so the images appear slightly in front of other gauges (i.e., near the driver). Note that the display device 1 only shows static stereoscopic images of the numbers 20*a*, the tick marks 20*b*, and the borderline 20*c*; the display device 1 does not show the moving of needle 20*d* of the speedometer 20 as an image. In other words, real parts are used for movable components such as the needle 20*d*.

The numbers 20*a*, the tick marks 20*b*, and the borderline 20*c* are shown as stereoscopic images in this embodiment. However, the numbers 20*a*, tick marks 20*b*, and borderline 20*c* may also be inscribed on speedometer 20 in the panel 2. Moreover, the numbers 20*a* may be shown only as a stereoscopic image; or, tick marks 20*b* may be shown as only a stereoscopic image; or, the borderline 20*c* may be shown as a stereoscopic image and inscribed on the speedometer 20. Any of these designs may be adopted as appropriate.

Figure 6:
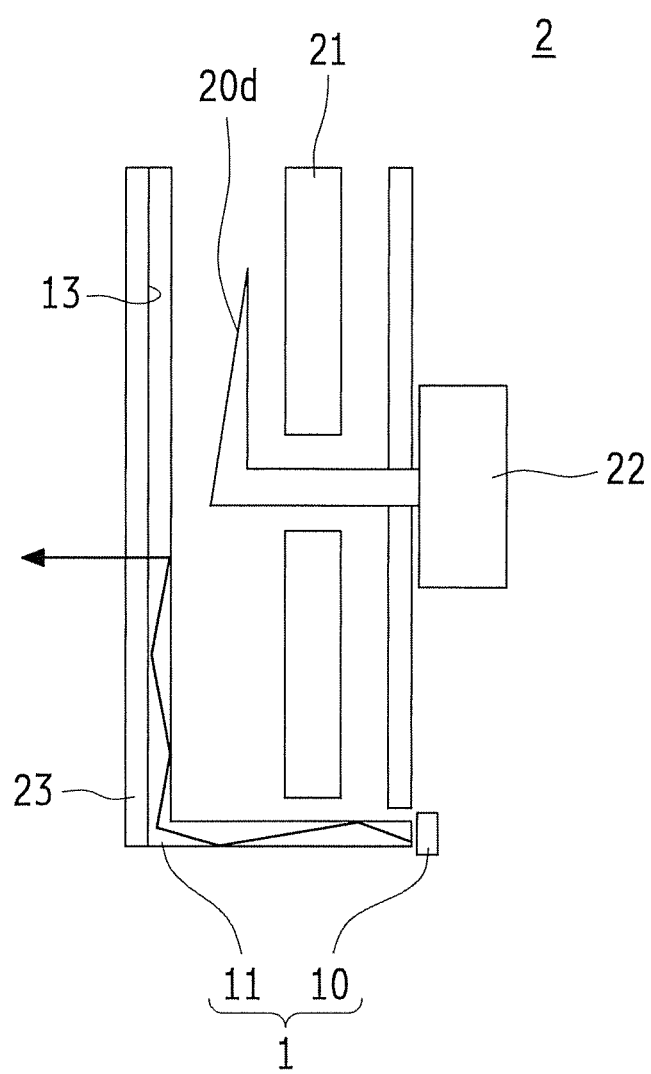
FIG. 6 is a schematic cross-sectional view illustrating a vehicle instrument panel provided with a display device according to one or more embodiments of the present invention.

FIG. 6 is a schematic cross-sectional view illustrating a vehicle instrument panel provided with a display device according to one or more embodiments of the present invention; FIG. 6 depicts the components just in front of the panel 2 along the left side and the components toward the back on the right side. The panel 2 is provided a gauge panel 21 and a needle 20*d* that function as for instance the speedometer 20; a needle controller 22 drives the needle 20*d* according to a measurement object such as the speed. The panel 2 is covered at the front by a transparent, hardened thin-film protective cover 23 formed by using a resin material such as a polycarbonate resin or a poly methyl methacrylate resin. The protective cover 23 may be provided so that the driver cannot touch the speedometer 20 directly. The protective cover 23 covering the panel 2 may be arranged to cover the entire front surface of the instrument panel 2, or to cover a portion of the front surface of the panel 2 by covering individual gauges. The light source 10 in the display device 1 according to one or more embodiments of the invention is provided at the lower back end of the gauge panel 21, and a thin-film light guide plate 11 is attached to the light source 10. The light guide plate 11 extends from the lower part of the gates panel 21 toward the front, extends orthogonally upward in front of the needle 20d and is adhered at the back surface (the rear side) of the protective cover 23. The light guide plate 11 may be bonded the front surface (front side) of the protective cover. The light focusing portions 15 in the light guide plate 11 are formed on the part of the light guide plate 11 extending orthogonally. Light is output from the emission surface 13 which is the surface toward the front, to present a static image of the numbers 20a, the tick marks 20b, the borderline 20c, and the like.

Figure 7:
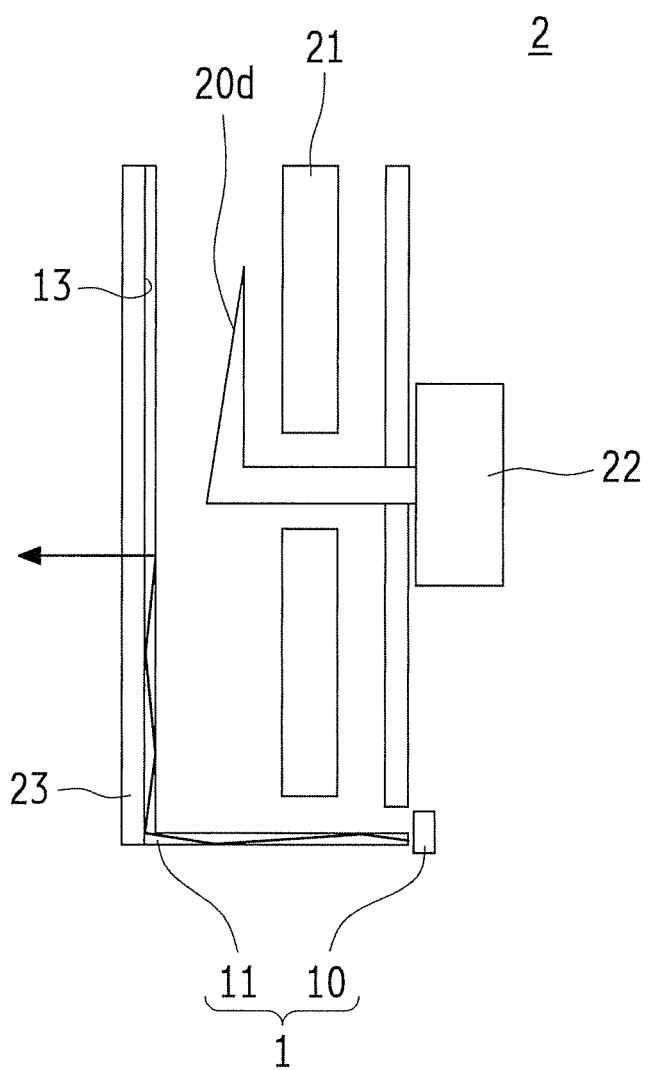
FIG. 7 is a schematic cross-sectional view illustrating a vehicle instrument panel provided with a display device according to one or more embodiments of the present invention.

FIG. 7 is a schematic cross-sectional view illustrating a vehicle instrument panel provided with a display device according to one or more embodiments of the present invention; FIG. 7 is another configuration of the panel 2 illustrated in FIG. 6. FIG. 7 depicts an example where the light guide plate 11 is made from a flexible thin film (or film) material. The thin-film light guide plate 11 is adhered to the rear side of protective cover 23 in the display device 1 illustrated in FIG. 7. All other aspects are identical to the configuration illustrated in FIG. 6. The thin-film light guide plate 11 in the display device 1 illustrated in FIG. 7 may be adhered to the front side of the protective cover 23.

Figure 8:
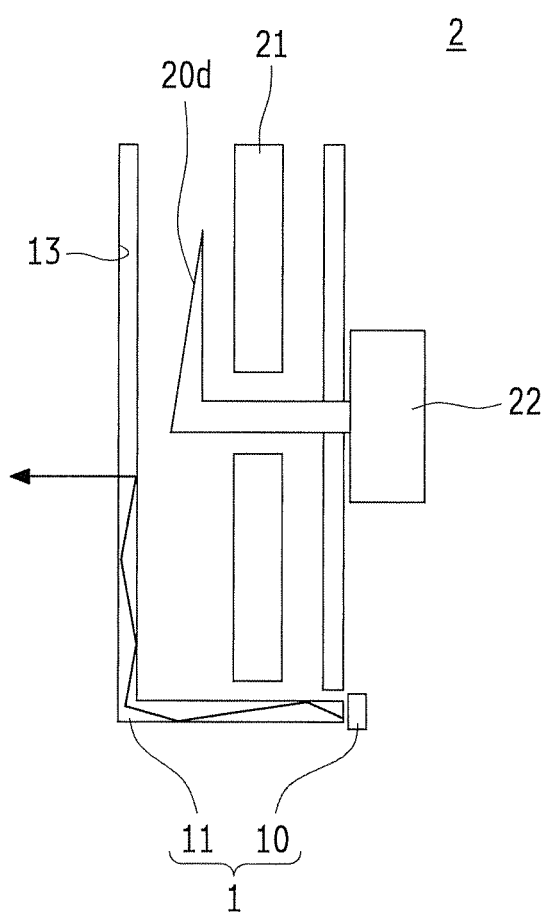
FIG. 8 is a schematic cross-sectional view illustrating a vehicle instrument panel provided with a display device according to one or more embodiments of the present invention.

FIG. 8 is a schematic cross-sectional view illustrating a vehicle instrument panel provided with a display device according to one or more embodiments of the present invention. FIG. 8 is another configuration of the panel 2 illustrated in FIG. 6. FIG. 8 depicts an example where the protective cover and the light guide plate 11 are integrally molded. More specifically, a transparent thin-film light guide plate 11 serves as the protective cover; in other words, light focusing portions are formed on this protective cover and a light source 10 is attached thereto. All other aspects are identical to the configuration illustrated in FIG. 6.

As above described, the display device 1 may be implemented in various ways and provided to a panel 2. The panel 2 displays a static stereoscopic image of the numbers 20a, tick marks 20b, and borderline 20c in front of a gauge panel 21 and a needle 20d. Thus, a panel 2 provided with a display device 1 according to one or more embodiments of the invention provides superior advantages, such as allowing for highly elaborate presentations.

The present invention is not limited to the above described embodiments and may be implemented in various other ways. Therefore, in all respects the above embodiments are merely example and should not be interpreted as limitations. The scope of the present invention is delineated by the claims and not limited by the specification. Moreover, all modifications and variations with a scope equivalent to the claims are within the scope of the present invention.

Figure 9:
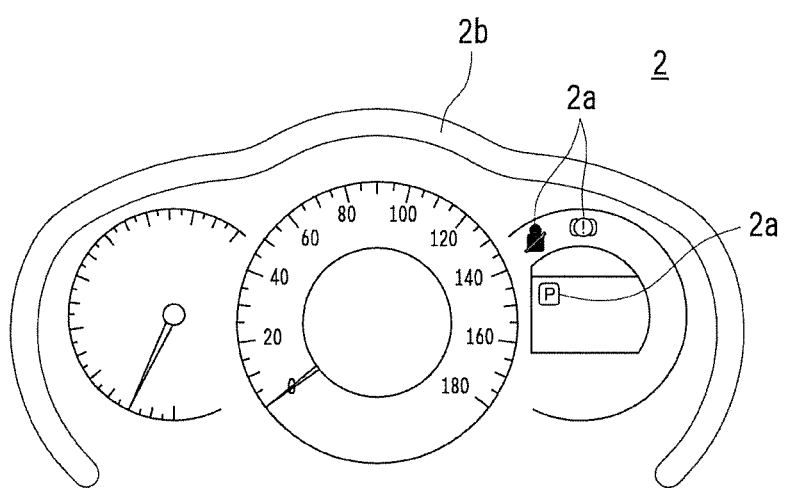
FIG. 9 is a schematic front view illustrating the components of a vehicle instrument panel provided with a display device according to one or more embodiments of the present invention.

For instance, in the above embodiments the stereoscopic images presented pertain to the vehicle gauges; however, the present invention is not limited thereto and may be developed in various ways to provide stereoscopic images of warning indicators, or the like. FIG. 9 is a schematic front view illustrating the components of a vehicle instrument panel provided with a display device according to one or more embodiments of the present invention. The display device 1 according to one or more embodiments of the present invention is able to show a static image with fixed form as a stereoscopic image. In other words, indications pertaining to the vehicle state, indications pertaining to ridership, or indications pertaining to the operation of the vehicle. FIG. 9 depicts images 2a representing the vehicle state, ridership state, and vehicle operation state, namely a brake warning indicator, an unbuckled seatbelt indicator showing whether a passenger has buckled the seatbelt, and a gear position indicator (shown as "P", FIG. 9), respectively. These kinds of images 2a are not limited to the images illustrated in FIG. 9 and may further include images representing, for instance, a water temperature indicator, a headlamp beam direction indicator, a fog light indicator, a four-wheel drive indicator, an engine warning indicator, an oil pressure warning indicator, a battery warning indicator, a fuel level warning indicator, an ABS warning indicator, an SRS warning indicator, and direction indicators. The gear shift position indicator is not limited to the "P" as depicted in FIG. 9 but may also include images of other gear positions "N", "R", "D", "2", "L", or further may include an image indicating the state of an overhead light. The stereoscopic image shown is not limited to being an image itself, and maybe a stereoscopic image designed for decoration. For example, a decorative stereoscopic image may be shown that decorates around the gauges as depicted by the ornament 2b in FIG. 9. In addition to the various other ornaments around the gauges as depicted in FIG. 9, an image presented as an ornament 2b may be different from an image presented to function primarily as a gauge or a warning indicator in the panel 2; such an image may be designed provide a rider an image that is generally visually appealing. Note that it is possible for an image with a primary functional purpose to also serve as an ornament. Moreover, a series of different stereoscopic images may be shown to thereby present an image that appears to move.

The invention claimed is:

1. A display device configured to show an image inside an instrument panel for a vehicle, the display device comprising:
   a light source configured to emit light; and
   a light guide element configured to guide incident light from the light source,
   wherein the light guide element comprises:
      an emission surface configured to output incident light, and
      a plurality of light focusing portions,
   the plurality of light focusing portions changes the path of the incident light toward the emission surface, causing the light output from the plurality of light focusing portions to converge toward or radiate from a plurality of convergence points outside the light guide element and thereby form an image outside the light guide element,
   the plurality of convergence points is on a same plane, and
   the light guide element is configured to form light to thereby present the image.

2. The display device according to claim 1, further comprising:
   a protective cover configured to cover all or part of an instrument panel,
   wherein the light guide element is adhered to said protective cover.

3. The display device according to claim 2,
wherein the portion of the light guide element adhered to the protective cover is a hard thin film or a flexible thin film.

4. The display device according to claim 3,
wherein the image presented is configured as a static image inside an instrument panel.

5. The display device according to claim 3,
wherein the image presented is configured to relate to a gauge inside an instrument panel.

6. The display device according to claim 3,
wherein the image presented is configured to represent at least one of a vehicle state, a ridership state, or a vehicle operation state.

7. The display device according to claim 2,
wherein the image presented is configured as a static image inside an instrument panel.

8. The display device according to claim 2,
wherein the image presented is configured to relate to a gauge inside an instrument panel.

9. The display device according to claim 2,
wherein the image presented is configured to represent at least one of a vehicle state, a ridership state, or a vehicle operation state.

10. The display device according to claim 1,
wherein the light guide element is configured to cover all or part of an instrument panel.

11. The display device according to claim 10,
wherein the image presented is configured as a static image inside an instrument panel.

12. The display device according to claim 10,
wherein the image presented is configured to relate to a gauge inside an instrument panel.

13. The display device according to claim 10,
wherein the image presented is configured to represent at least one of a vehicle state, a ridership state, or a vehicle operation state.

14. The display device according to claim 1,
wherein the image presented is configured as a static image inside an instrument panel.

15. The display device according to claim 14,
wherein the image presented is configured to relate to a gauge inside an instrument panel.

16. The display device according to claim 1,
wherein the image presented is configured to relate to a gauge inside an instrument panel.

17. The display device according to claim 16,
wherein the image presented configured to include at least one of numbers, tick marks, or a borderline for a gauge.

18. The display device according to claim 1,
wherein the image presented is configured to represent at least one of a vehicle state, a ridership state, or a vehicle operation state.

19. The display device according to claim 1,
wherein the image presented is configured as a decorative image inside an instrument panel.

20. A display device mounted in a conveyance and configured to show an image inside the conveyance, the display device comprising:
a light source configured to emit light; and
a light guide element configured to guide incident light from the light source,
wherein the light guide element comprises:
an emission surface configured to output incident light, and
a plurality of light focusing portions,
the plurality of light focusing portions changes the path of the incident light toward the emission surface, causing the light output from the plurality of light focusing portions to converge toward or radiate from a plurality of convergence points outside the light guide element and thereby form an image outside the light guide element,
the plurality of convergence points is on a same plane, and
the image presented is configured as at least one of numbers, tick marks, or a borderline for a gauge.

* * * * *